United States Patent [19]
Miller et al.

[11] Patent Number: 5,254,926
[45] Date of Patent: Oct. 19, 1993

[54] CURRENT-MODE HYSTERESIS CONTROL FOR CONTROLLING A MOTOR

[75] Inventors: John M. Miller, Saline; Roy I. Davis, Canton; Richard J. Hampo, Livonia; John R. Grabowski, Dearborn; Paul T. Momcilovich, Carleton, all of Mich.

[73] Assignee: Ford Motor Company, Dearborn, Mich.

[21] Appl. No.: 898,762

[22] Filed: Jun. 10, 1992

Related U.S. Application Data

[63] Continuation-in-part of Ser. No. 787,805, Nov. 4, 1991, Pat. No. 5,159,542.

[51] Int. Cl.$^5$ .................................... H02P 5/00
[52] U.S. Cl. .................................... 318/798; 318/801
[58] Field of Search ........ 318/254, 439, 138, 799–812; 361/23, 31, 93, 94, 98; 363/55, 56, 50

[56] References Cited

U.S. PATENT DOCUMENTS

| | | |
|---|---|---|
| 3,866,099 | 2/1975 | Bourbeau . |
| 4,368,411 | 1/1983 | Kidd . |
| 4,528,486 | 7/1985 | Flaig et al. ............... 318/254 |
| 4,644,234 | 2/1987 | Nola ........................ 318/254 |
| 4,825,132 | 4/1989 | Gritter ..................... 318/811 |
| 4,904,919 | 2/1990 | McNaughton ......... 318/811 X |
| 4,912,343 | 3/1990 | Stuart . |
| 4,969,662 | 11/1990 | Stuart . |
| 5,027,048 | 6/1991 | Masrur et al. . |
| 5,038,092 | 8/1991 | Asano et al. ............ 318/811 |
| 5,060,959 | 10/1991 | Davis et al. . |
| 5,091,679 | 2/1992 | Murty et al. . |

*Primary Examiner*—Jonathan Wysocki
*Attorney, Agent, or Firm*—Roger L. May; Paul K. Godwin, Jr.

[57] ABSTRACT

System and method for high-speed, high-accuracy control of a multiphase motor in a vehicle having a DC power supply in response to a motor command signal, the system being a substantially digital implementation. The system includes programmable digital logic for generating a digital desired phase current signal for a particular motor phase. A signal indicative of the actual current in the particular motor phase is generated. The system includes comparators for comparing the desired phase current signal with the actual phase current signal and generating a digital error signal based on the difference between the desired and actual phase current signals. Additionally, the system includes an inverter, including a plurality of switches, for generating the actual current in the particular motor phase from the DC power supply. Based on the digital error signal, the digital logic generates a digital switch state output signal to control the operating state of the inverter. The system also preferably includes a sensor for providing a motor position feedback signal to the programmable digital logic.

11 Claims, 6 Drawing Sheets

CURRENT-MODE HYSTERESIS CONTROL FOR CONTROLLING A MOTOR

CROSS-REFERENCE TO RELATED APPLICATION

This application is a continuation-in-part of U.S. Ser. No. 07/787,805, filed Nov. 4, 1991, titled "Current Mode Hysteresis Controller For Pulse Width Modulated Inverter" now U.S. Pat. No. 5,159,542.

TECHNICAL FIELD

The present invention is related to a system and method for digitally controlling a multiphase AC motor for use in a vehicle having a DC power supply.

BACKGROUND ART

AC motors in comparison to DC motors are generally of simpler structure and include the advantages of lower cost, more compact size, less weight and better operation at higher speeds and higher efficiencies. However, controllers for AC motors have been complex and expensive, hampering the adoption of AC motors for use with DC supplies such as motor vehicle batteries.

One system useful for the regulation of motor currents is the current regulating pulse-width modulated (CRPWM) inverter. The inverter typically utilizes analog comparators and summing amplifiers to process a computer-generated reference current command for each phase of the motor in such a manner as to determine the states of upper and lower phase switches in the power stage of the inverter. Simplification of AC motor controllers has resulted from the use of such current-mode controllers.

For current-mode control, the current flowing into the motor is measured and compared to reference current signals which are generated by a motor controller and are representative of desired current for the motor to effect desired operating conditions. Error signals resulting from the comparison are used to switch semiconductor elements of an inverter circuit which provides power to the motor. Pulse-width modulated DC power is thus rapidly switched to the motor terminals.

One popular form of current-mode control utilizes hysteresis comparators, wherein the actual currents within a motor are maintained within a band of given amplitude centered on reference currents which are representative of desired current levels within the motor. An example of hysteresis current-mode control is disclosed in U.S. Pat. No. 5,027,048, issued to Masrur et al. on Jun. 25, 1991, which is assigned to the assignee of the present invention and is hereby incorporated by reference. The hysteresis motor controller of the Masrur et al. patent also discloses the use of field-oriented control, which is another important improvement in the control of AC motors.

Referring now to FIG. 1, a schematic diagram of a current-mode controller is shown generally by reference numeral 10. The current-mode controller 10 is for use in the current-mode hysteresis controller disclosed in the above-referenced pending application, U.S. Ser. No. 07/787,805, filed Nov. 4, 1991. As shown in FIG. 1, the comparators 12 each include first comparator means including an operational amplifier 14 which sums or compares a desired inverter output current ($I_\phi$) for a particular phase with a sensed inverter output current ($I_\phi$), to generate error signals representative of the difference therebetween.

The error signals from the amplifier 14 are passed to current band control means including an amplifier 16, which amplifies the error signals by an amplification factor determined by resistors 18, 20 and 22. The upper and lower signal limits of the hysteresis bands for the amplified error signals are determined by second comparator means including a comparator 24. The amplified error signals are compared to the fixed upper and lower signal limits to define at least two hysteresis bands. The amplification factor of the amplifier 16 is selectively controlled by means of a transistor 26 which is controlled via a hysteresis switch (HSW1) signal applied through a resistor 28.

For the case of two hysteresis bands, the amplification factor of the amplifier 16 is selected based on the desired inverter output current $I_\phi$ for the particular phase or the reference current for that phase. The selection in this case can be performed by a comparator 30 which sums or compares the desired inverter output current $I_\phi$ with a signal representative of a desired reference current $I_{REF}$. Thus, the transistor 26 determines whether the resistor 22 is connected into the gain control circuit for the amplifier 16 or shorted out and not included in determining the gain. For operation with more than two hysteresis bands, additional control resistors 32 and corresponding control transistors 34 can be provided and controlled by a corresponding hysteresis switch (HSW2-HSWX) signal to define a series of gains for the amplifier 16.

With continued reference to FIG. 1, the upper and lower limits to which the amplified error signals are compared are substantially fixed for a given application. However, the limits can be selected within defined ranges. The upper limit for the comparison to the amplified error signal is performed by the amplifier 24 as defined by the setting of a potentiometer 36. The lower limit for the comparison to the amplified error signals is performed by the amplifier 24 as defined by the setting at a potentiometer 38 in cooperation with an amplifier 40 and the precision reference voltage $V_{REF}$. The potentiometer 36 defines the width of the hysteresis window and the potentiometer 38 and precision reference voltage $V_{REF}$ adjusts the symmetry of the hysteresis window.

The method of operating the current-mode hysteresis controller 10 for controlling a pulse-width modulated inverter in response to desired and sensed inverter output currents includes the steps of sensing the output current in a pulse-width modulated inverter circuit to be controlled and generating a reference current representative of the desired current for the sensed motor phase. The method also includes the steps of comparing the sensed output current to the reference current to generate error signals representative of the differences therebetween and generating an inverter current switch signal whenever the error signals exceed a selected hysteresis band surrounding the reference current. The method also includes the steps of defining at least two hysteresis bands surrounding the reference current and corresponding to different reference current magnitudes and selecting one of the hysteresis bands.

These systems make use of analog circuitry. Component characteristic variations due to temperature effects can cause analog circuit outputs to drift somewhat over time. Analog drift introduces DC components into the motor current, thereby adding errors to the current regulation and control of motor torque, position and/or speed.

Accordingly, there is a need for an improved control system and method for substantially reducing errors associated with the use of analog hardware for current regulation while still providing for high efficiency, high accuracy system operation.

SUMMARY OF THE INVENTION

It is therefore an object of the present invention to provide a control system and method for high speed, high accuracy control of a motor, which is impervious to thermal drift and other analog-implementation related characteristics.

It is a further object of the present invention to provide a control system and method for motor control wherein various control strategies may be implemented.

In carrying out the above object and other objects and features of the present invention, a current-mode hysteresis control system is provided for controlling a multiphase motor in a vehicle having a DC power supply based on a motor command signal. The control system comprises programmable logic means for generating a digital desired phase current signal for a particular motor phase in response to the motor command signal and means for generating an actual phase current signal based on the actual current in the particular motor phase. The control system also comprises comparator means for comparing said desired phase current signal with the actual phase current signal and generating a digital error signal based on the difference therebetween and inverter switch means for generating the actual phase current for the particular motor phase from the DC power supply. Preferably, the programmable logic means generates a digital switch state output signal to control the operating state of the inverter switch means based on the digital error signal.

Preferably, the digital desired phase current signal includes an upper limit and a lower limit to define a hysteresis band and the programmable logic means controls the operating state of the inverter switch means when the actual phase current signal has a value outside of the hysteresis band.

The advantages accruing to the present invention are numerous. For example, a digital hysteresis band is utilized, improving motor control and control system immunity to noise and eliminating the necessity of complex signal conditioning circuitry, as well as providing a simplified means for selecting various hysteresis bands.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
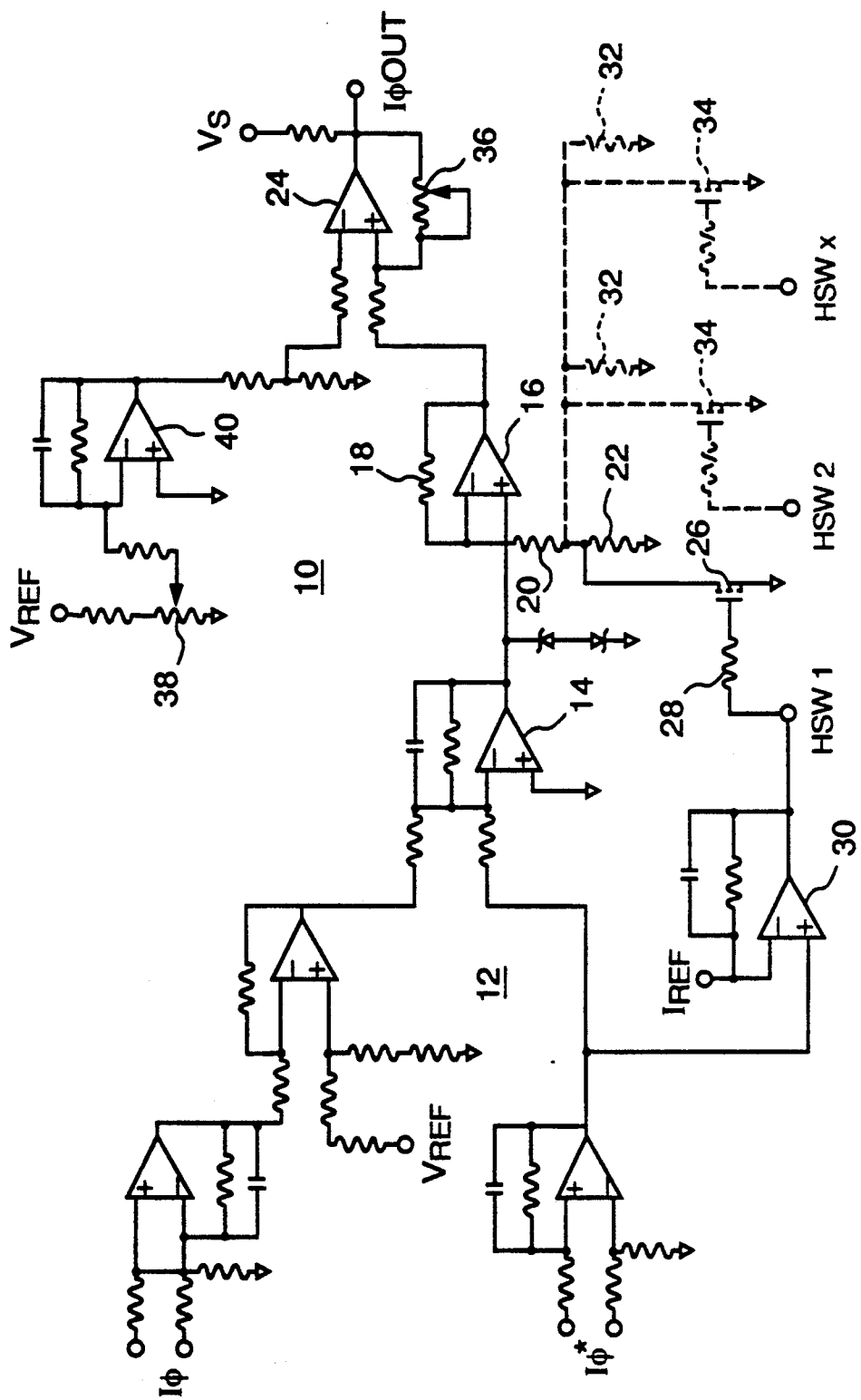
FIG. 1 is schematic diagram of a current-mode hysteresis controller as shown in the above-referenced copending patent application.
Figure 2:
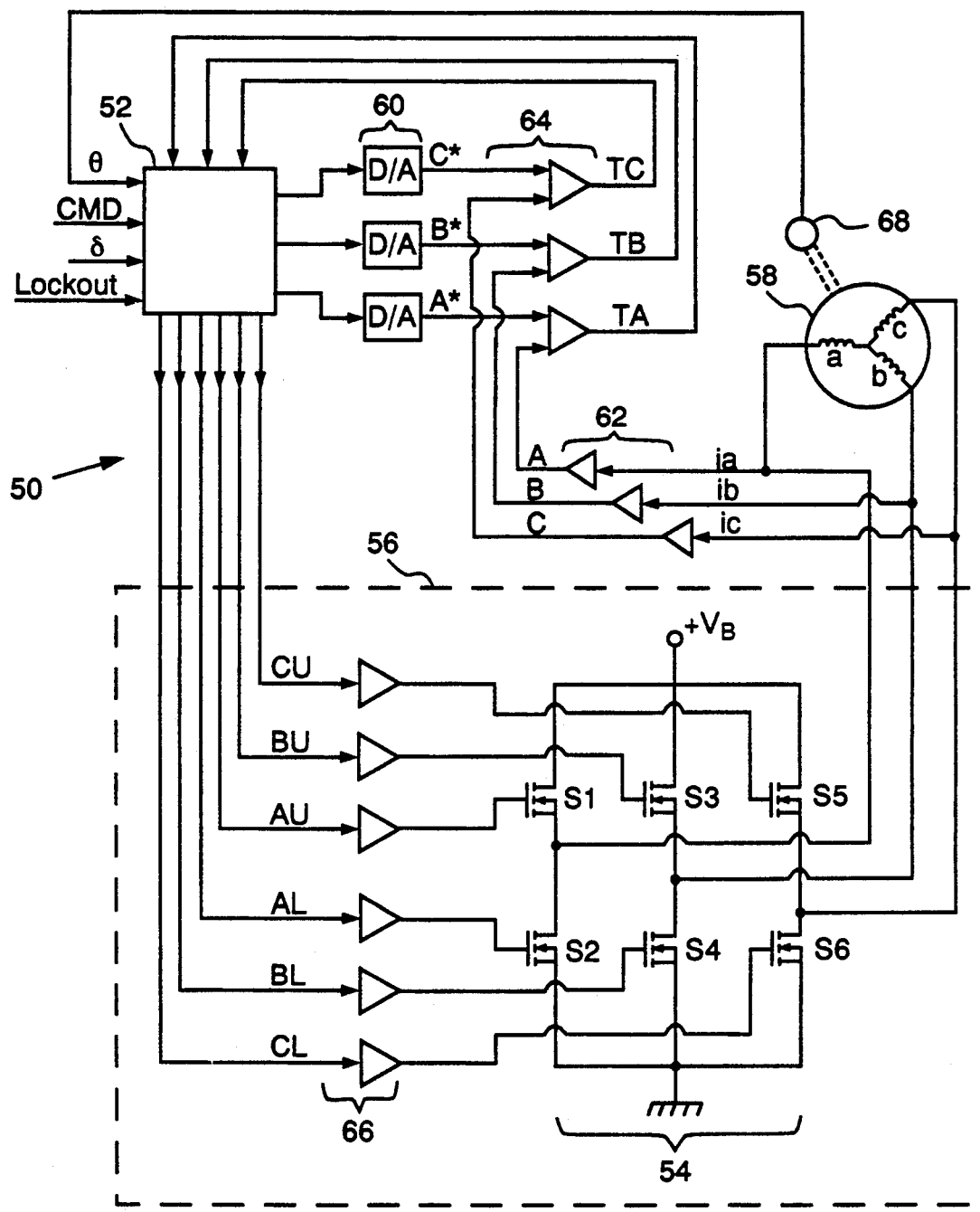
FIG. 2 is a block diagram of the current-mode hysteresis control system of the present invention.

Referring now to FIG. 2, there is illustrated a functional block diagram of a current-mode hysteresis control system shown generally by reference numeral 50. As shown, the current-mode hysteresis control system 50 includes a logic device, such as an application specific integrated circuit (ASIC) 52. Although shown to be an ASIC, the logic device could be a programmable device, implemented as a microprocessor, microcontroller, digital signal processor, or as a collection of discrete standard digital logic devices (e.g. 'and' gates, 'or' gates, etc.). While use of a microprocessor or a microcontroller allows for greater flexibility by virtue of programmability, the more hardware oriented approach of utilizing an ASIC allows for a very fast, parallel processing approach for each set of phase calculations. This fast, parallel processing approach is especially amenable to an application requiring high-speed, high accuracy control, such as in an electrically actuated automotive active suspension.

Generally, the logic device 52 reads control and feedback inputs to generate reference signals and switch state outputs, which are utilized to activate the power stage 54 of the inverter 56. Preferably, the inverter 56 is a three-phase inverter which in turn controls an AC drive (i.e. 180° phase current conduction), such as a three-phase motor 58. More specifically, the logic device 52 reads and stores a torque command signal (CMD), a hysteresis band signal ($\delta$) and a desired lockout time signal (LOCKOUT) communicated from a separate system microprocessor, such as the vehicle master microprocessor not specifically illustrated. The logic device 52 also reads a digital signal ($\Theta$) from the rotor position sensor 68, which is preferably a dual-purpose multi-turn encoder, such as that which is commercially available from Semifusion of Morgan Hill, Calif., United States of America. In the preferred embodiment, the signal from the sensor 68 is a digital signal which includes angle information. The inverter 56 includes a plurality of switches, or transistors, S1-S6, which collectively comprise the power stage 54 and supply current to the motor 58, as described in greater detail hereinbelow. Although the transistors S1-S6 are shown as enhancement mode N-channel type metal-oxide semiconductor field-effect transistors (MOSFETs), bipolar transistors or other high-speed switching devices could also be utilized.

With continued reference to FIG. 2, the control system 50 also includes a plurality of digital-to-analog (D/A) sample-and-hold converters 60 in electrical communication with the logic device 52. The logic device 52 generates a plurality of digital signals, representative of a desired or reference value of current for each phase of the motor 58. In the preferred embodiment, this reference current is 12 bits and includes a hysteresis band embedded therein. The hysteresis band defines upper and lower limits within which the actual motor phase currents should remain, as described in greater detail below. Unlike a hysteresis band established utilizing analog hardware, a digitally established hysteresis band is dynamically programmable, providing the advantages of improved motor control and improved system immunity to noise and errors associated with thermal drift. The digital reference phase currents from the logic device 52 are then converted into corresponding analog signals (i.e. A·, B· and C·) by the D/A sample-and-hold converters 60.

As shown in FIG. 2, actual phase currents (i.e. $i_a$, $i_b$ and $i_c$) from the motor 58 are processed by the signal conditioning circuitry shown generally by reference numeral 62, resulting in the conditioned phase current signals A, B and C. Preferably, signal conditioning circuitry 62 utilizes operational amplifiers, such as part number LF444, commercially available from National Semiconductor, Santa Clara, Calif., United States of America. The operational amplifiers 62 function to convert, or scale, the motor current into a logic voltage level utilizing a gain factor. The analog reference signals from the D/A sample-and-hold converters 60 (i.e. A·, B· and C·) are compared with the conditioned phase current signals representing the actual motor phase currents by the comparators shown generally by reference numeral 64. As shown, the comparators 64, such as part number LM319, are commercially available from National Semiconductor, Santa Clara, Calif., United States of America, and are in electrical communication with the logic device 52. Since the D/A output is compared with the conditioned phase current, the gain factor of the operational amplifiers 62 is selected to obtain equivalent scaling to the D/A output level.

Preferably, the outputs of the comparators 64 (i.e. TA, TB and TC) are digital, having logic levels which are in the true (i.e. high or "1") state when the reference current signal is less than or equal to the actual current signal, and false (i.e. low or "0") otherwise. The TA, TB, and TC signals indicate to the logic device 52 when one or more transistor states must be changed through the action of the transistor state outputs labelled as AU, AL, BU, BL, CU, and CL.

With continuing reference to FIG. 2, in the preferred embodiment, the transistor state outputs from the logic device 52 are digital and are buffered by the gate or base drives shown generally by reference numeral 66 prior to being applied to the transistors S1–S6. Since the logic device 52 "knows" the present transistor states and the desired changes in those states to be made, interactions between the individual phases of the motor 58 can be closely coordinated. For example, the "zero state" exists when all the upper transistors (i.e. S1, S3 and S5) or all lower switches (i.e. S2, S4 and S6) are in the on-state concurrently. This condition, which occurs frequently in analog implementations, can lead to generally unregulated current flow in the motor 58 when the current command is small and the motor speed is low. The digital implementation of the present invention avoids the zero state condition by coordinating the phase transistor states in the logic device 52 prior to setting the transistor state outputs to their next state.

Since the switch state outputs AU, AL, BUI, BL, CU, and CL are digital, they can be timed digitally by the logic device 52, so as to have embedded within them the LOCKOUT time. In the preferred embodiment, the LOCKOUT time is a delay applied to an on-going switch state signal and is primarily dependent on the technology of the transistors S1–S6. Thus, MOSFET transistors have different LOCKOUT times than bipolar transistors. This delay is provided so as to ensure no short circuit condition exists across the DC voltage bus, which extends from V. to ground. This condition would occur when any pair of complementary switches (i.e. S1 and S2) comprising a phase leg are both in the "on" state at the same time. This delay results in a small inverter current phase error. Unlike the previous systems which implement the lockout time with relatively complicated operational amplifier circuits, a lockout time implemented digitally is dynamically programmable and requires much less complex hardware.

Thus, the control system 50 is a substantially digital implementation. All direct input to and output from the logic device 52 is digital, minimizing the need for complex signal conditioning circuitry associated with prior analog implementations. Unwanted DC components, which are introduced into the motor phase currents through thermal drift, component variations and noise, are therefore minimized, maximizing the speed and accuracy of motor control.

It should be appreciated that, unlike analog circuitry which are typically designed for a particular control strategy, the control system 50 provides flexibility by permitting various control strategies to be utilized. For example, the control system 50 could utilize a fixed-frequency delta modulation, adjacent state control or space vector control strategy, instead of hysteresis control. Fixed-frequency delta modulation, which is similar to hysteresis control, utilizes a hysteresis band of zero and a timing element to limit the switching frequency. Adjacent state control and space vector control require knowledge of the current switch states and only permit certain next state transitions based on current operating conditions and switch states. Thus, for any given application, various control strategies can be easily implemented and tested, and the strategy that yields the best performance in the application can be utilized.

Figure 3:
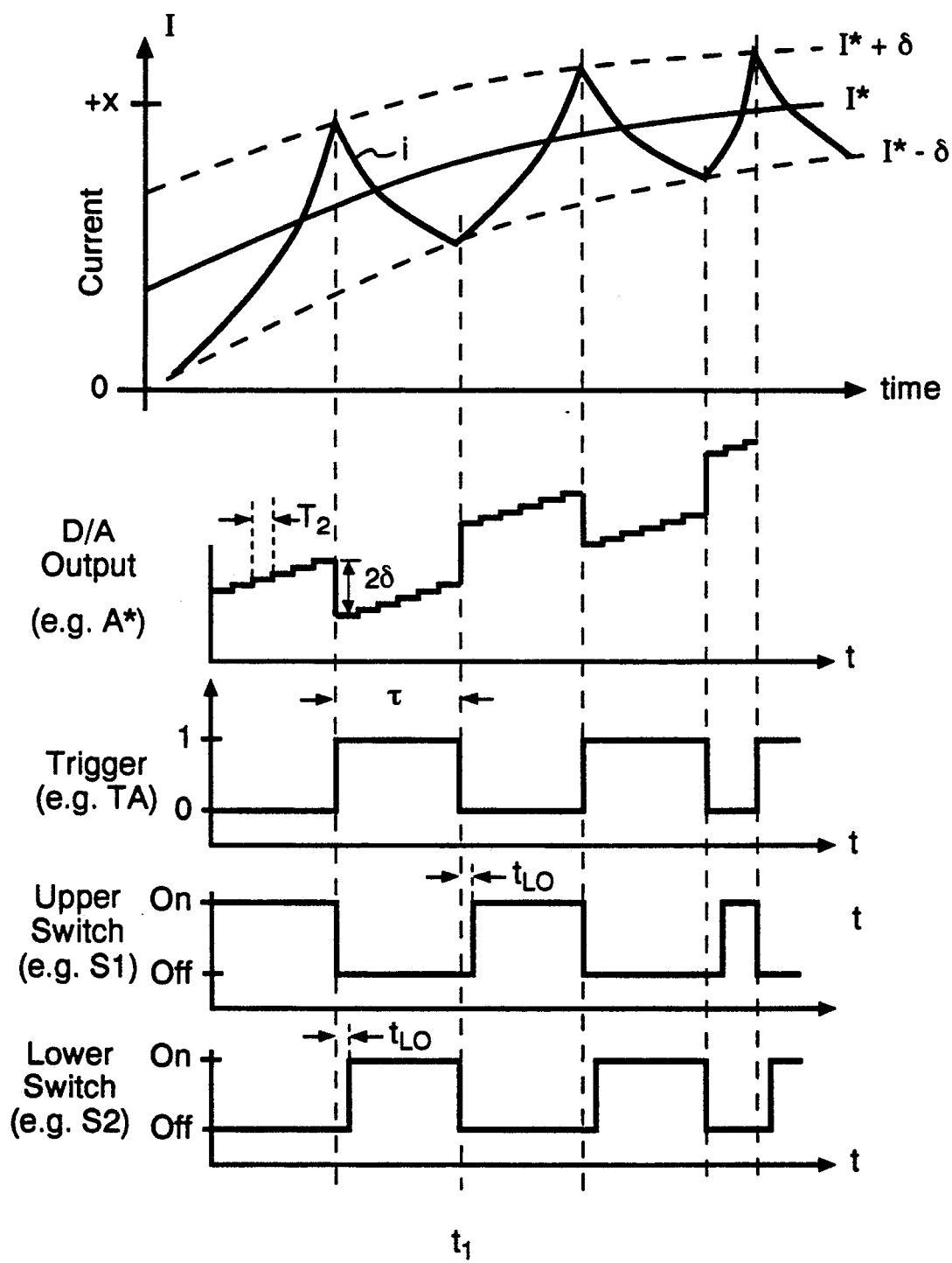
FIG. 3 is a graphical representation of the desired phase current, the hysteresis band, the actual phase current and corresponding timing diagrams associated with a positive (source) phase current.
Figure 4:
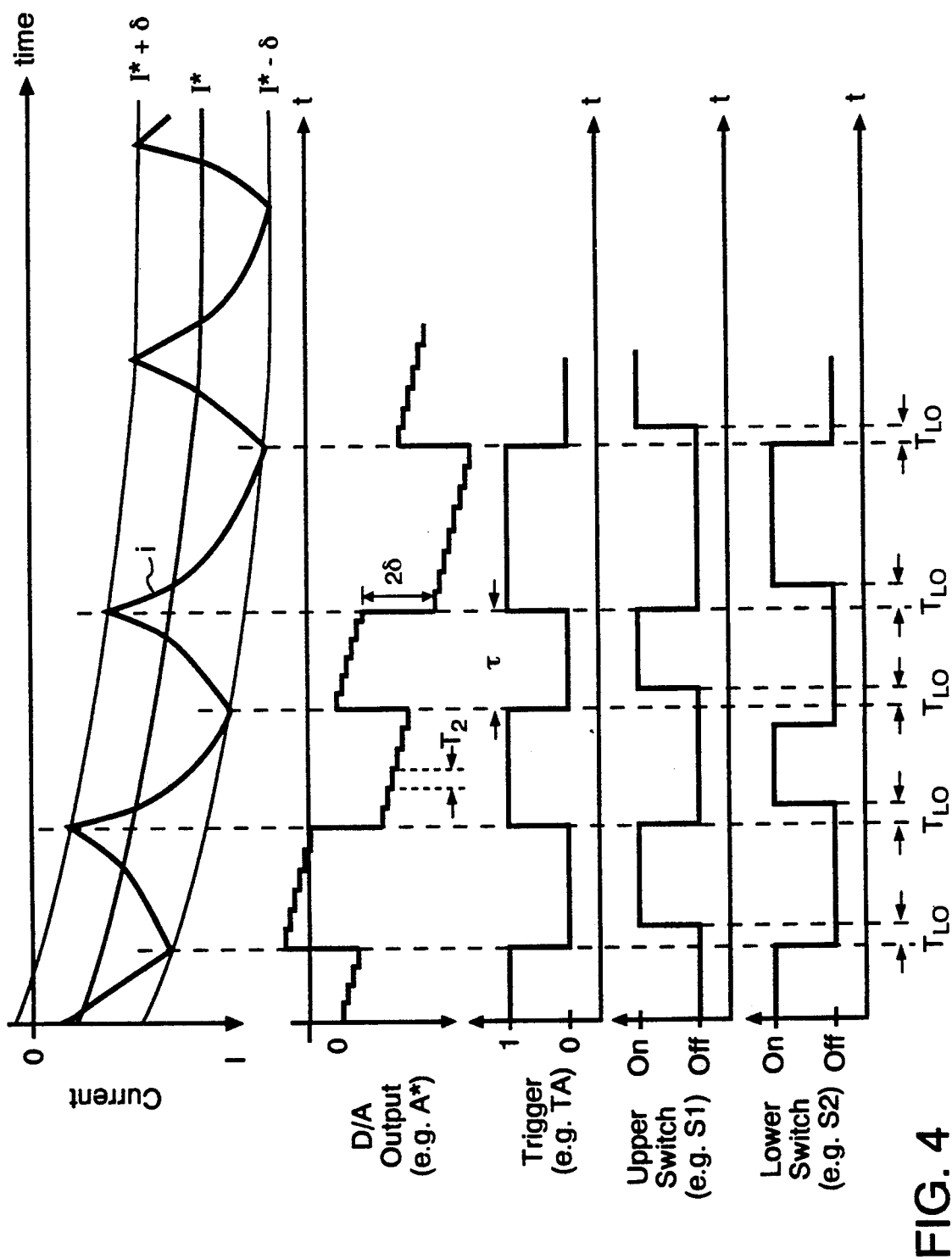
FIG. 4 is a graphical representation of the desired phase current, the hysteresis band, the actual phase current and corresponding timing diagrams associated with a negative (sink) phase current.

Referring now to FIGS. 3 and 4, there are shown graphical representations of the desired phase currents and hysteresis bands, actual phase currents and associated timing diagrams for positive (source) and negative (sink) current, respectively. In the graph, the desired phase current is shown generically by I·, the hysteresis band is defined by an upper limit $(I·+\delta)$ and a lower limit $(I·-\delta)$, and the actual phase current is shown generally by i. Through the switching action in the power stage 54, the current in each phase rises or falls about the reference current I* as dictated by the time constant of the motor 58. The motor time constant is due primarily to the effective resistance and inductance of the motor winding and the applied voltage (i.e. either a net positive or net negative voltage resulting from the supply voltage $V_B$, counter emf, and the voltages present on the other phases).

As shown in FIGS. 3 and 4, when the actual phase current i rises above the upper limit $(I·+\delta)$ or falls below the lower limit $(I·-\delta)$, a state change must occur in the transistors associated with that phase. With specific reference to FIG. 3, at time t=t1, when a comparator 64 indicates that an actual phase current (e.g. $i_a$) has fallen below the lower limit $(I·-\delta)$ by transitioning the signal TA from a logic level true to a logic level false, the switch states AU and AL are modified. As a result, the low transistor for that phase (i.e. S2) is biased into a non-conductive state or turned off, and the upper transistor (i.e. S1) is biased into a conductive state or turned on, after the appropriate LOCKOUT time ($t_{LO}$) has expired. When this occurs, a voltage (approximately $\frac{2}{3}V_B$ less the counter emf) is applied to the appropriate phase winding of the motor 58, causing the current to rise in that phase winding. This applied voltage also depends on the other phases switch states.

Preferably, the logic device 52 concurrently generates a new desired or reference phase current (I·) and an upper limit having a value of I·+δ, which represents the upper limit of the hysteresis band. The current in the phase winding continues to increase until the actual phase current measured (i.e. $i_a$) exceeds the new upper limit, at which time TA toggles again to a logic true state. This transition then causes the reference current to revert to I·−δ, which represents the lower limit of the hysteresis band and reverse the polarity of the voltage applied to the phase winding, tending to drive the current in the negative direction. This process continues for all three phases during motor operation.

Figure 5:
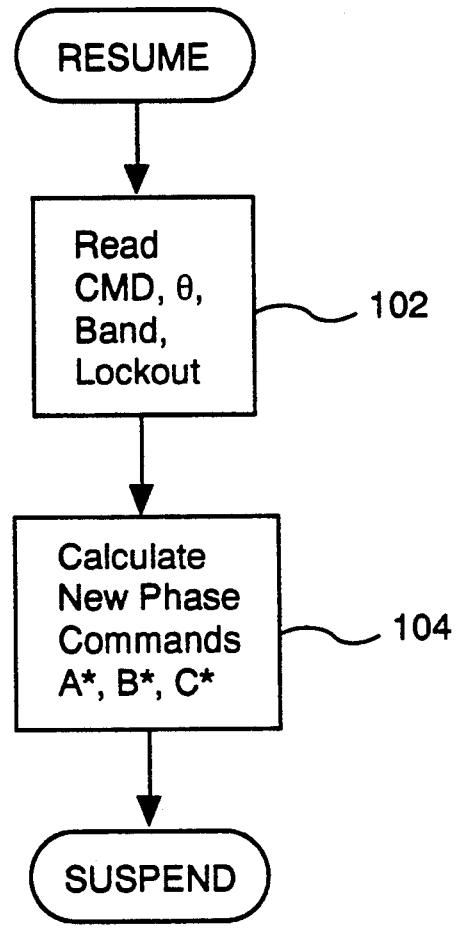
FIG. 5 is a flow chart detailing the determination of the new desired or reference phase currents.
Figure 6:
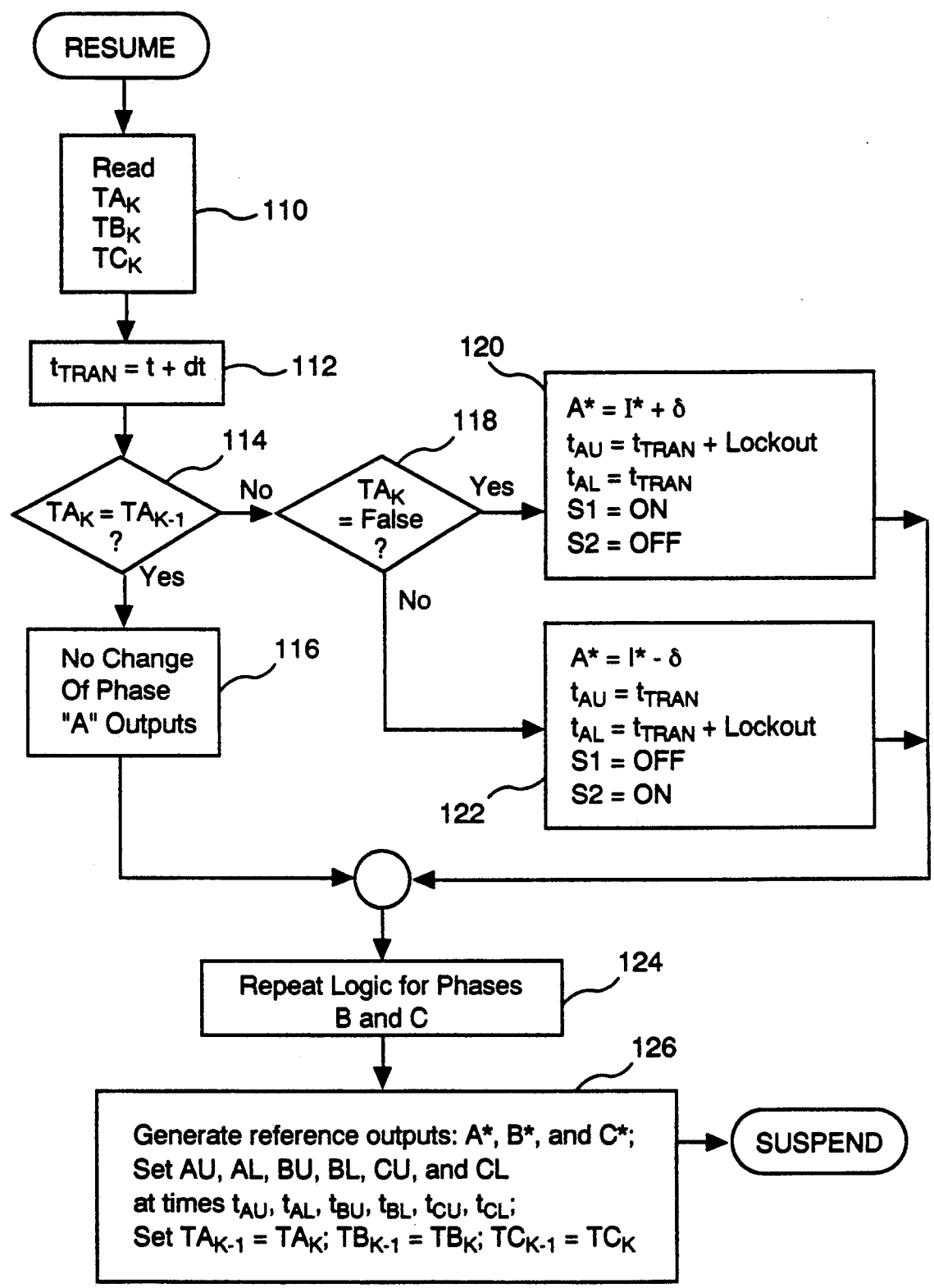
FIG. 6 is a flow chart detailing the updating of the desired or reference phase current commands and the determination of the switch state outputs.

Referring now to FIGS. 5 and 6, there are shown flow charts detailing the determination of the new desired or reference phase current commands (i.e. A*, B*, and C*) and for determining the switch state outputs (AU, AL, BU, BL, CU, and CL), as would be implemented in a microprocessor, microcontroller or a digital signal processor. Preferably, these two repetitive routines run typically at different update times, $T_1$ and $T_2$, respectively. Since the torque command (CMD) and the angular position Θ change much more slowly than the chopped current waveforms $i_a$, $i_b$, and $i_c$, $T_1$ is typically longer than $T_2$. At step 100, the logic device 52 reads the CMD signal, the rotor position signal (Θ), the hysteresis band signal (δ) and the LOCKOUT signals. At step 102, the logic device 52 determines the three phase current references according to the following equations:

$$A^{\cdot}=k_q{}^*CMD^*cos(\Theta+90^\circ)+k_d{}^*CMD^*sin(\Theta+90^\circ)$$

$$B^{\cdot}=k_q{}^*cos(\Theta+90^\circ-120^\circ)+k_d{}^*CMD\cdot{}^*sin(\Theta+90^\circ-120^\circ)$$

$$C^*=-A^*-B^* \qquad (1)$$

wherein $k_q$ is the conversion from the torque command CMD to current in the quadrature axis of the motor, $k_d$ is the conversion from the torque command CMD to current in the direct axis of the motor and Θ is the electrical angular position of the rotor from the rotor position sensor 68 (shown in FIG. 2).

Referring now to FIG. 6, determination of the updated references A·, B· and C· and the switch state outputs (AU, AL, BU, BL, CU and CL) will be discussed. At step 110, immediately upon entering the routine, the present outputs of the three comparators 64 (i.e. TA, TB and TC) are read by the logic device 52. For purposes of the flowchart, a subscript k has been added to denote that these samples are for the present iteration of the task, while a subscript of k−1 denotes samples read during the previous iteration.

At step 112, the logic device 52 determines the time ($t_{TRAN}$) at which the transitions on the switch state outputs will be made if any are required. Preferably, $t_{TRAN}$ is set to the present time (t), plus a small delay (dt), which has a length allowing completion of the rest of the routine before the transitions are commanded.

With continued reference to FIG. 6, beginning at step 114 the switch state outputs are computed for each phase. At step 114, $TA_k$ is compared with $TA_{k-1}$. If these signal levels are equal, there is no switch state change required for phase A (step 116). If, however, the comparator output has changed from the previous iteration, then a switch state change is required. In the preferred embodiment, T1 and T2 are selected such that the comparison at step 114 is performed several times between the detection of a required state change. For example, assigning TI a value of approximately 2 mS and assigning T2 a value of approximately 200 μS would satisfy this preference. Since it is desirable to detect a change in the output of the comparators 64 as soon as possible, the speed of the logic device 52 depends on the value of δ (i.e. smaller δ requires a faster processor).

As shown in FIG. 6, if the present comparator output for phase A is determined to be is false at step 118, then the previous state was true, signifying that the actual current in phase A has decreased below the reference (refer to FIG. 3 or 4). Thus, at step 120 the reference current signal A· is preferably changed to the value of I*+δ, the switch state AU is toggled, biasing the upper transistor for phase A (i.e. S1) into a conductive state (i.e. turned on) and the switch state AL is also toggled, biasing the lower transistor (i.e. S2) into a non-conductive state (i.e. turned off). This will apply positive voltage $V_B$ to the phase A motor winding, increasing the current. With the phase A switch states having been determined, the timing of the transition is preferably set. The on-going transistor is preferably turned on only after the off-going transistor has been turned off, thereby avoiding a short circuit across V. to ground. Such a short circuit condition, sometimes referred to as "shoot-through", could damage the power switching devices. Therefore, also at step 120 the transition time ($t_{AU}$) for Phase A upper transistor is preferably set equal to ($t_{TRAN}$) plus the LOCKOUT time and the lower transistor is turned off at $t_{TRAN}$.

If the present comparator output for phase A is determined to be true at step 118, then the previous state was false, signifying that the actual current in phase A has increased beyond the reference current. If this condition exists, at step 122 switch state AU is preferably toggled, thereby biasing the upper transistor S1 into a non-conductive state and switch state AL is also toggled, thereby biasing the lower transistor S2 into a conductive state. Concurrently at step 122, the reference signal A* is set to I·−δ. Similarly, the on-going transistor switch should be turned on only after turning off the off-going transistor. Thus, also at step 122 the transition time ($t_{AU}$) for phase A lower transistor S2 is preferably set equal to ($t_{TRAN}$) plus the lockout time (LOCKOUT) and the upper transistor S1 is turned off at time $t_{TRAN}$.

At step 124, steps 110 through 122 are repeated for the other two phases of the motor. At step 126, the logic device 52 generates the reference current signals, digitally sets the switch state outputs AU, AL, BU, BL, CU and CL at times $T_{AU}$, $T_{AL}$, $t_{BU}$, $t_{BL}$, $t_{CU}$ and $t_{CL}$, respectively. Also at step 126, the logic device 52 sets $TA_{k-1} = TA_k$, $TB_{k-1} = TB_k$ and $TC_{k-1} = TC_k$.

As an alternative to the above logic, the calculations for each phase could be performed separately and simultaneously. This would have the advantage of minimizing the delay between sensing a change in the trigger inputs (e.g. TA) and in effectuating the corresponding changes in switch state outputs (e.g. AU and AL).

It is to be understood, of course, that while the form of the invention described above constitutes the preferred embodiment of the invention, the preceding description is not intended to illustrate all possible forms thereof. It is also to be understood that the words used are words of description, rather than limitation, and that various changes may be made without departing from the spirit and scope of the invention, which should be construed according to the following claims.

We claim:

1. A current-mode hysteresis digital control system for controlling a motor based on a motor command signal, the motor having a plurality of phases, the digital control system comprising:

programmable logic means for generating a digital desired phase current signal for a particular motor phase in response to the motor command signal;

means for generating an actual phase current signal based on the actual current in the particular motor phase;

comparator means for comparing said desired phase current signal with the actual phase current signal and generating a digital error signal based on the difference therebetween; and inverter switch means, including at least two switches for each motor phase, for generating the actual phase current for the particular motor phase from a DC power supply, the programmable logic means generating a digital switch state output signal to control the operating state of the inverter switch means based on the digital error signal, the digital switch state output signal digitally timed to include a lockout time for delaying the generation of the actual phase current by the inverter switch means so as to protect the at least two switches from a short circuit condition.

2. The control system of claim 1 wherein the programmable logic means generates the digital desired phase current signal for a particular motor phase based on at least one motor operating parameter.

3. The control system of claim 1 wherein the digital desired phase current signal includes one of an upper limit or a lower limit to define a hysteresis band.

4. The control system of claim 3 wherein the programmable logic means controls the operating state of the inverter switch means when the actual phase current signal has a value without the hysteresis band.

5. A method of digitally controlling a multiphase motor coupled to an inverter, based on a motor command signal, the method comprising the steps of:

generating a desired motor phase current signal in response to the motor command signal;

generating an actual motor phase current signal based on the actual motor phase current;

comparing said desired motor phase current signal with said actual motor phase current signal to generate a digital error signal based on the difference therebetween; and generating a digital switch state output signal to digitally control the operating state of the inverter based on the digital error signal, the digital switch state output signal digitally timed to include a lockout time for protecting the inverter from a short circuit condition, thereby supplying the actual motor phase current to the motor.

6. The method of claim 8 wherein the desired motor phase current includes one of an upper limit or a lower limit to define a hysteresis band.

7. The method of claim 9 wherein the digital switch state output signal is generated to digitally control the operating state of the inverter when the actual motor phase current signal has a value without the hysteresis band.

8. A current-mode hysteresis digital control system for controlling a multiphase motor based on a motor command signal, the digital control system comprising:

programmable logic means for generating a digital desired phase current signal for a particular motor phase in response to the motor command signal;

means for generating an actual phase current signal based on the actual current in the particular motor phase;

comparator means for comparing said desired phase current signal with the actual phase current signal and generating a digital error signal based on the difference therebetween; and inverter switch means, including at least two switches for each motor phase, for generating the actual phase current for the particular motor phase from a DC power supply, the programmable logic means for generating a digital switch state output signal to control the operating state of the inverter switch means based on the digital error signal, the digital switch state output signal digitally timed to include a lockout time for delaying the generation of the actual phase current by the inverter switch means so as to protect the at least two switches from a short circuit condition.

9. The control system of claim 8 wherein the programmable logic means generates a digital desired phase current signal for a particular motor phase based on at least one motor operating parameter.

10. The control system of claim 8 wherein the digital desired phase current signal includes one of an upper limit or a lower limit to define a hysteresis band.

11. The control system of claim 10 wherein the programmable logic means controls the operating state of the inverter switch means when the actual phase current signal has a value without the hysteresis band.

* * * * *

UNITED STATES PATENT AND TRADEMARK OFFICE
CERTIFICATE OF CORRECTION

PATENT NO. : 5,254,926

DATED : October 19, 1993

INVENTOR(S) : John M. Miller et al

It is certified that error appears in the above-identified patent and that said Letters Patent is hereby corrected as shown below:

Column 6, line 60, "(I - $\delta$)" should be --(I$^*$ - $\delta$)--.

Column 7, line 5, "(I)" should be --(I)--.

Column 7, line 6, "I + $\delta$" should be --I$^*$ + $\delta$--.

Column 7, line 12, "I - $\delta$" should be --I$^*$ - $\delta$--.

Column 7, line 1 of Formula 1 should read as follows:
$$A^* = k_q*CMD*\cos(\theta+90°) + k_d*CMD*\sin(\theta+90°)$$

Column 7, line 2 of Formula 1 should read as follows:
$$B^* = k_q*CMD*\cos(\theta+90°-120°) + k_d*CMD*\sin(\theta+90°-120°)$$

Column 7, line 48, "A, B and C" should be --A$^*$, B$^*$ and C$^*$--.

Column 8, line 13, before "false" delete "is".

Column 8, line 17, "A" should be --A$^*$--.

Column 8, line 29, "V" should be --V$_B$--.

Column 8, line 35, after "at" insert --time--.

Column 8, line 45, "I - $\delta$" should be --I$^*$ - $\delta$--.

UNITED STATES PATENT AND TRADEMARK OFFICE
CERTIFICATE OF CORRECTION

PATENT NO. : 5,254,926
DATED : October 19, 1993
INVENTOR(S) : John M. Miller et al It is certified that error appears in the above-identified patent and that said Letters Patent is hereby corrected as shown below:

Column 1, line 67, "$(I\phi)$" should be --$(I_\phi^*)$--.

Column 2, line 18, "$(I\phi)$" should be --$(I_\phi^*)$--.

Column 2, line 22, "$(I\phi)$" should be --$(I_\phi^*)$--.

Column 5, line 7, "(i.e. A, B and C)" should be --(i.e. $A^*$, $B^*$ and $C^*$)--.

Column 5, line 21, "(i.e. A, B and C)" should be --(i.e. $A^*$, $B^*$ and $C^*$)--.

Column 5, line 60, "BUI" should be --BU--.

Column 6, line 2, "V." should be --$V_B$--.

Column 6, line 42, "I" should be --$I^*$--.

Column 6, line 43, "$(I + \delta)$" should be --$(I^* + \delta)$--.

Column 6, line 44, "$(I - \delta)$" should be --$(I^* - \delta)$--.

Column 6, line 55, "$(I + \delta)$" should be --$(I^* + \delta)$--.

Column 6, line 56, "$(I - \delta)$" should be --$(I^* - \delta)$--.

UNITED STATES PATENT AND TRADEMARK OFFICE
CERTIFICATE OF CORRECTION

PATENT NO. : 5,254,926

DATED : October 19, 1993

INVENTOR(S) : John M. Miller et al

It is certified that error appears in the above-identified patent and that said Letters Patent is hereby corrected as shown below:

Column 8, line 55, "$T_{AU}$" and $T_{AL}$" should be --$t_{AU}$-- and --$t_{AL}$--.

Column 10, line 10, Claim 6, after "claim" delete "8" and substitute --5--.

Column 10, line 13, Claim 7, after "claim" delete "9" and substitute --6--.

Signed and Sealed this

Seventh Day of June, 1994

BRUCE LEHMAN

*Attest:*

*Attesting Officer*     *Commissioner of Patents and Trademarks*